E. P. WILLIAMS.
GRAIN SHOVEL.
No. 49,330.  Patented Aug. 8, 1865.
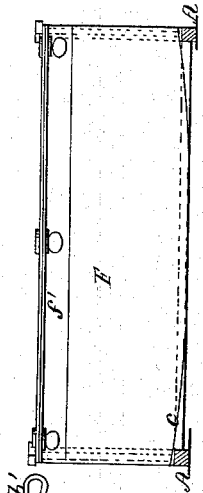
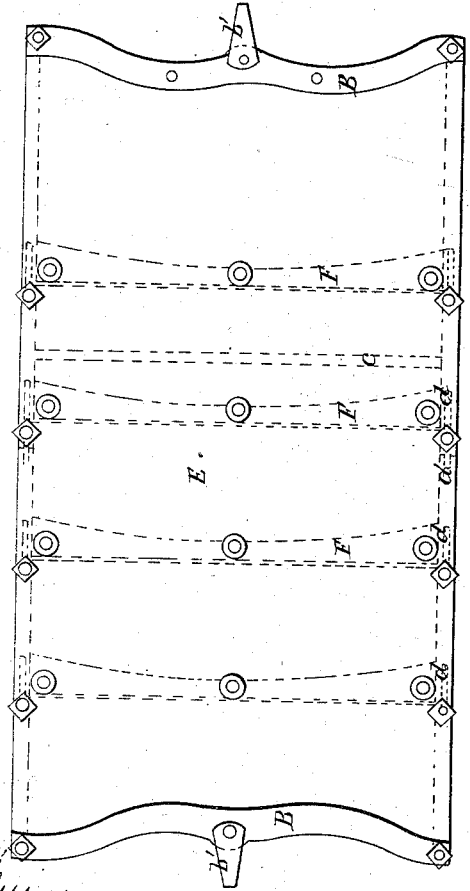
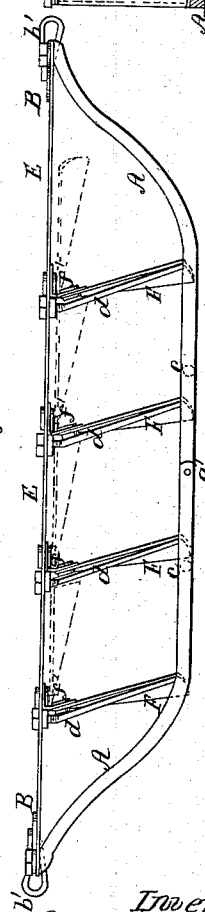
Witnesses:
M. P. Fillmore
J. R. Forbush
Inventor:
E. P. Williams

UNITED STATES PATENT OFFICE.

ELIJAH P. WILLIAMS, OF BUFFALO, NEW YORK.

IMPROVEMENT IN GRAIN-SHOVELS.

Specification forming part of Letters Patent No. 49,330, dated August 8, 1865; antedated August 4, 1865.

*To all whom it may concern:*

Be it known that I, ELIJAH P. WILLIAMS, of the city of Buffalo, county of Erie, and State of New York, have invented a new and Improved Grain-Shovel for Use in Moving Grain in Vessels, Warehouses, and other Places; and I do hereby declare that the following is a full and exact description thereof, reference being had to the accompanying drawings, making a part of this specification, in which—

Figure I is a longitudinal elevation. Fig. II is a transverse sectional elevation, and Fig. III is a top-plan view.

Letters of like name and kind refer to like parts in each of the figures.

The nature of this invention relates to the construction of a skeleton runner-like frame, of metal, wood, or other material, in which is hung one, two, three, or more pendent flaps or shovel-blades, forming a grain-shovel, to be operated by any convenient application of power, so that in the forward movement of the shovel these flaps or shovel-blades will scrape or move forward the grain, and in the backward movement these flaps or shovel-blades will easily slide over the grain without moving it back.

The skeleton frame-work of my improved shovel consists of two runners, made runner shape at both ends, as shown at A, and hinged or jointed in the middle, as shown at $a'$; but the runners may or may not be jointed in the middle, as preferred. I make and use them in either way. These runners are connected at each end, on the top, by cross-bars B, which have a hook or clevis in the center or at the corners, (for fastening the operating chain or rope to,) as shown at $b'$. There are also several cross-tie rods at the bottom, as shown at C, and several posts rising upwardly from the runners and inclining slightly back, as shown at $d$. I also place strengthening rods or chains longitudinally from corner of the runners to strengthen the forward pull. This frame has a top or covering of leather, heavy canvas, or other elastic material, as represented in the drawings at E.

The flaps or shovel-blades are shown at F. These are made of thin plates of metal, and have a leather hinge at the upper edge thereof, as shown at $f'$, by which they are connected to the elastic covering or to the frame, and are thereby made pendent downwardly, and freely swing upon their hinges; but they are prevented from swinging far back by means of the posts $d$ when filled with grain in the forward movement.

Shovels of this kind are intended to be used and operated in the hold of vessels where the grain is, or at such other place where grain is to be moved, and will be connected to appropriate mechanism for giving them an alternate back-and-forth movement. When used for unloading grain-vessels they will be placed in such proximity to the elevating-leg, which is used for elevating the grain from the vessel to the storehouse or for transferring it to other vessels, so that the shovel will deliver the grain to the foot of the elevating-leg at each forward movement. When used for "trimming" vessels in loading they will be arranged and worked accordingly. When used in storehouse for moving the grain back into the bins, they will be arranged and operated for that purpose. These flaps or blades being hinged to the top or covering, they are free to swing forward in their backward movement, and hence will slide over the grain easily in the back movement without carrying back any grain; but in their forward movement they fill with grain, resting against the posts $d$ at a slight incline, so that they will scrape or move forward the grain in their forward movement. The runner shape of the frame will allow it to slide easily through the grain in either direction. As many of these shovels as are requisite may be connected and worked in line, they being made in sections for that purpose, so that grain from the most distant parts of the vessel may be reached and moved along to the elevating-leg, as described. The frame being made of light metal, and the runners being jointed in the middle, and the top or covering being made of leather or other material, the shovels are thereby given a perfect adaptability to the work they are required to perform.

This device as a whole is very light, and may be worked with less power than any other device in use for that purpose.

What I claim as my invention, and desire to secure by Letters Patent, is—

A grain-shovel having a skeleton runner-like frame, A, and pendent flaps or shovel-blades F, with an elastic compressible top or covering, E, for the purposes and substantially as described.

E. P. WILLIAMS.

Witnesses:
M. P. FILLMORE,
E. B. FORBUSH.